Sept. 14, 1965 R. D. McCOY 3,206,753
VARIABLE BANDWIDTH TRACKING SYSTEM
Filed Dec. 26, 1958 2 Sheets-Sheet 1

INVENTOR
BY Rawley D. McCoy
B. F. Spencer
AGENT

Sept. 14, 1965  R. D. McCOY  3,206,753
VARIABLE BANDWIDTH TRACKING SYSTEM
Filed Dec. 26, 1958  2 Sheets-Sheet 2

INVENTOR
BY Rawley D. McCoy
B. F. Spencer
AGENT

United States Patent Office 3,206,753
Patented Sept. 14, 1965

3,206,753
VARIABLE BANDWIDTH TRACKING SYSTEM
Rawley D. McCoy, Bronxville, N.Y., assignor, by mesne assignments, to Dynamics Corporation of America, New York, N.Y., a corporation of New York
Filed Dec. 26, 1958, Ser. No. 783,653
17 Claims. (Cl. 343—117)

This invention relates to positional control systems, and in particular to apparatus for automatically positioning a directive element for tracking a moving object.

Radar systems used for fire control, missile guidance, and similar applications must be designed to track moving targets with great accuracy. Tracking must also be accomplished as smoothly as possible without unduly sacrificing system accuracy. An important factor in determining both the tracking accuracy and the smoothness with which a radar system will operate when following a maneuvering target is the bandwidth of its antenna servo positioning system. A wide bandwidth will provide a "tight," accurate system having a relatively short time constant while a narrow bandwidth will result in a smoother system having a longer time constant.

A target whose angular velocity is changing rapidly relative to the tracking station will produce an error control signal comprised of a wide band of frequency components. If the radar is to follow this target with a minimum of lag between the directive axis of the antenna and the true direction to the target, the antenna positioning servos must respond to all significant frequency components in the received signal. The servo pass band must, therefore, be wide enough to amplify all significant signal frequencies even though this mode of operation may result in some reduction in smoothness due to increased gain at the higher noise frequencies.

On the other hand, a radar system tracking a distant target, or a target moving with essentially constant angular velocity relative to the radar will receive signals having predominately low frequency components. Under these conditions the servo bandwidth may be narrow, thereby amplifying the low-frequency signal frequencies while, at the same time, improving tracking smoothness by attenuating all noise frequencies above the pass band.

It is highly desirable, therefore, that a radar tracking system possess a wide bandwidth when tracking targets having a high angular acceleration and a narrow bandwidth when tracking targets having a low, or zero, angular acceleration. It is further desirable that this bandwidth be continuously variable as a function of target movement, and that such change in bandwidth be accomplished automatically rather than manually.

Accordingly, it is a principal object of this invention to provide an improved variable bandwidth positional control system.

Another object is to provide a variable bandwidth positional control system wherein the bandwidth is automatically varied as a function of the magnitude of the error signal.

Still another object is to provide an automatic tracking system in which the response of the elevation and azimuth error channels are individually controlled by the magnitudes of the elevation and azimuth error signals respectively.

Yet another object is to provide an automatic tracking system in which the bandwidth is automatically increased and decreased at different rates.

A further object is to provide an automatic tracking system in which the response of the elevation error channel and the response of the azimuth error channel are controlled by the sum of the elevation and azimuth error signals.

Still a further object is to provide a variable bandwidth positioning system in which the system damping ratio is maintained constant while the bandwidth is varied.

The foregoing objects are achieved in the present invention in which the bandwidth, or response, of a servo amplifier is varied as a function of the magnitude of the error signal. The invention is especially suited for use in an automatic tracking system, and will be described in connection therewith, although it should be understood that it is not limited to this particular application.

In the type of automatic tracking system to be disclosed a directive antenna is provided which may be positioned in elevation and azimuth by separate drive motors. Radio frequency energy, reflected or transmitted from a target, is received at the antenna and conducted to a radio receiver having its output coupled to elevation and azimuth detectors. Error voltages, proportional to the angular difference between the target and antenna positions, are generated in the detectors, amplified, and applied to the elevation and azimuth antenna drive motors which position the directive axis of the antenna.

Servo systems may be made with configurations resulting in a predominant velocity error, acceleration error, or rate of change of acceleration error. For automatic tracking radar systems, with narrow bandwidth servo characteristics, a system with an acceleration error characteristic and essentially zero velocity error characteristic is usually used. The following discussion describes a system with such a configuration with essentially zero velocity error.

When a target having a low angular acceleration is being tracked the magnitude of the error voltage is relatively small since the radar antenna follows the target closely. The frequency components in the received signal are comparatively low and the bandwidth of the system may be narrow thereby providing improved noise suppression. At increased target angular accelerations, the antenna will lag further behind the target and the error voltage will increase. The servo bandwidth must then be increased so that the system will respond to the higher frequency components present in the signal, thereby decreasing the lag angle between the directive axis of the antenna and the true direction to the target. It is seen, therefore, that a small error voltage corresponds to the conditions under which a narrow bandwidth is needed and that a large error voltage is an indication that a relatively wide bandwidth is required.

In one embodiment of the invention, the output of the radar receiver is separated into elevation and azimuth error voltage components, and each component, after amplification in an associated variable control amplifier, is coupled to the corresponding elevation or azimuth drive motor. The elevation error voltage component is also coupled through a low-pass network to attenuate the high-frequency noise components, rectified to produce a voltage proportional to the magnitude of the filtered error voltage, and then coupled to a positional servo. The positional servo drives potentiometers in the variable control elevation amplifier which adjust the bandwidth of this evelation channel in accordance with the magnitude of the filtered elevation error voltage while simultaneously keeping the damping ratio of the elevation channel constant. Similarly, the azimuth error voltage component is filtered in a low-pass network, rectified, and used to drive another positional servo which positions potentiometers in the variable control azimuth amplifier. The bandwith of the azimuth channel is thereby varied in accordance with the magnitude of the filtered azimuth error voltage while the damping ratio of the azimuth channel is held constant. Thus, the bandwith of the elevation channel is made to vary directly with the magnitude of the elevation error signal, and the bandwidth of the azimuth channel is varied directly with the magnitude of the azimuth error signal. Non-linear circuit means are also included in both channels for increasing the bandwidth at a faster rate than it is decreased. It should be understood that the invention is not restricted to second order servo systems but may be used in conjunction with other types of systems as well.

In another embodiment of the invention, the elevation and the azimuth error signals are combined to form a single error voltage which simultaneously controls the response of both the elevation and azimuth channels. A good approximation is thereby obtained to the true error voltage with a considerable saving in equipment.

The above objects and the brief introduction to the present invention will be more fully understood and further objects and advantages will become apparent from a study of the following detailed description in connection with the drawings wherein.

Figure 1:
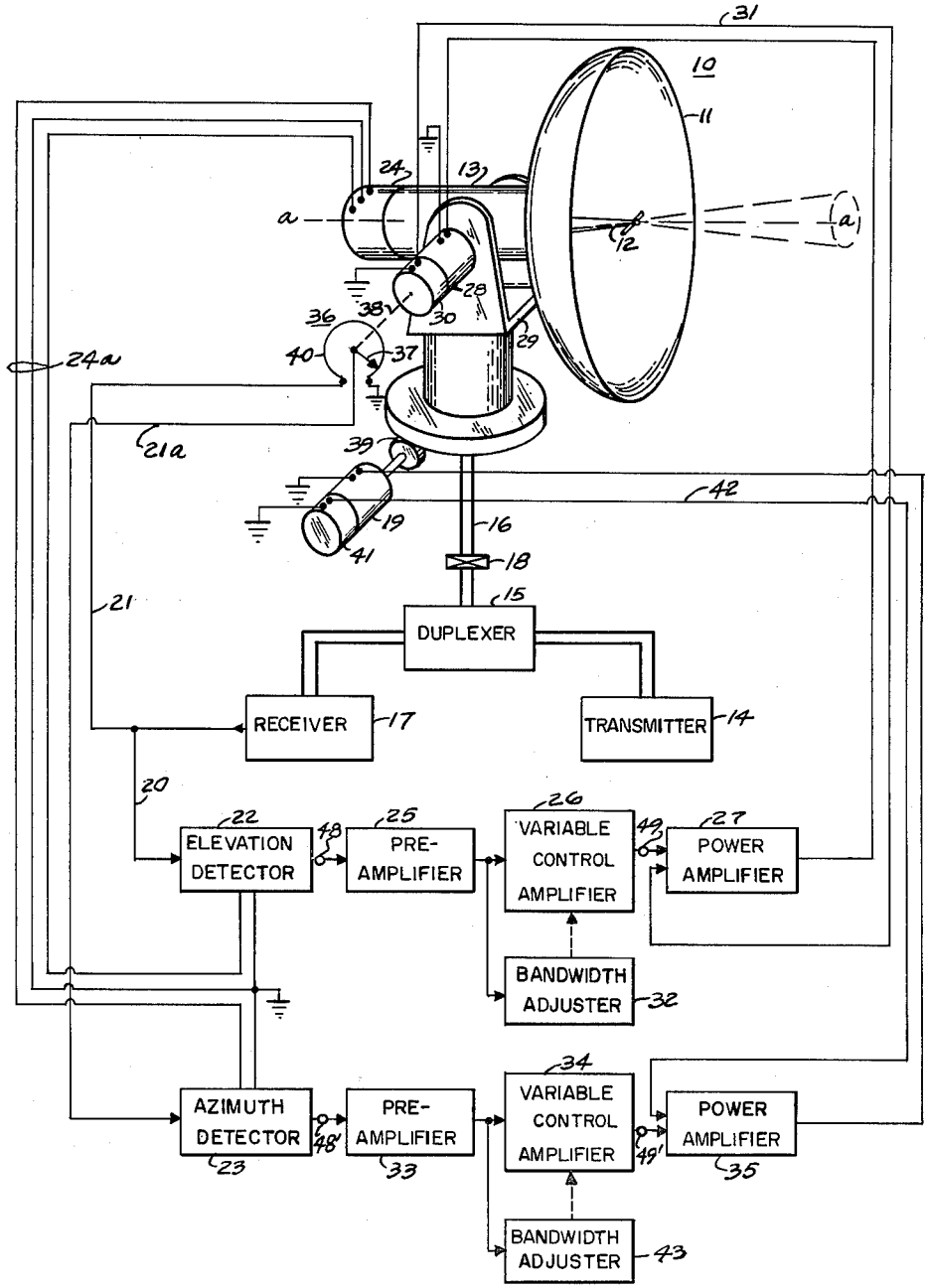
FIG. 1 is a block diagram of a preferred embodiment of the present invention.

Referring to FIGURE 1, a scanner 10 comprising a parabolic reflector 11 and an antenna 12 is adapted for the transmission of electromagnetic energy in the form of a directional beam. The antenna 12, which is used for both transmitting and receiving, is located at the focus of parabolic reflector 11 and is rotated by a motor 13 and conventional nutating mechanism (not shown) about the directive axis a—a of the scanner. Due to the motion of antenna 12 relative to reflector 11, the transmitted beam of electromagnetic energy describes a cone of radiation as shown by dashed lines in FIG. 1.

A high-frequency transmitter 14 couples pulser of radio energy through a duplexer 15 and wave guide 16 to the antenna 12. Any target which appears within the cone of radiation will reflect a portion of the received energy back to the antenna, and this energy is conveyed through wave guide 16 and duplexer 15 to the radar receiver 17. A rotating joint 18, in wave guide 16, permits azimuth drive motor 19 to turn scanner 10 continuously in the azimuth plane.

In conical scanning, the amplitude of the electromagnetic energy received from the target depends upon the angular displacement of the target relative to the directive axis of the radio beam. Since the beam is rotated in a conical path, the reflected energy varies in strength as the beam is rotated. Therefore, the reflected energy received by the antenna is amplitude modulated at a frequency corresponding to the nutating frequency of the antenna, and the amplitude of the modulation is a function of the displacement of the target relative to the directive axis a—a. The phase of the modulation is a function of the position of the target relative to the directive axis.

The energy reflected from the target and supplied to receiver 17 provides a measure of the angle between the directive axis of scanner 10 and the true direction of the target. The output of receiver 17 is an error signal which varies in amplitude at the nutating frequency and may be considered to have elevation and traverse angle error components. The elevation angle component is measured in the vertical plane while the traverse angle component is the angle measured at the radar in a slant plane including the target and the radar antenna. The traverse angle component is not, in general, equal to the azimuth angle which is measured in the horizontal plane and, since the directive axis of the scanner may be inclined with respect to the horizontal plane, a secant correcting potentiometer 36 is provided for transforming the error component in the traverse plane to an equivalent error component in the azimuth plane. This correction is needed in the azimuth channel to keep the channel sensitivity constant as the elevation angle of scanner 10 is changed. The practical range of secant potentiometer 36 is limited to about 80° since the secant of the elevation angle approaches infinity as the angle approaches 90°.

The output of receiver 17 is coupled directly to elevation detector 22 by a lead 20 and to one terminal of secant potentiometer 36 by a lead 21. The rotating arm 37 of potentiometer 36 is attached to elevation drive motor 28 by a mechanical connection shown schematically by dashed line 38 so that the displacement of potentiometer arm 37 corresponds to the elevation angle of scanner 10. Arm 37 of potentiometer 36 is electrically coupled to the input of azimuth detector 23 by means of a lead 21a and, since the resistive winding 40 of potentiometer 36 is formed so that the voltage on arm 37 varies as the secant of the elevation angle, the output signal of receiver 17 is modified by this function before application to azimuth detector 23.

A two-phase generator 24, driven in synchronism with antenna 12, provides quadrature reference voltages coupled by means of leads 24a to elevation and azimuth detectors 22 and 23. The phase of the modulation on the received signal is compared with one reference voltage in elevation detector 22 and with the other reference voltage in azimuth detector 23. Since the reference voltages are 90° out of phase with each other and since the elevation and azimuth axes are perpendicular, the magnitude of the output voltage of elevation detector 22 is proportional to the elevation angle error while the magnitude of the output voltage of azimuth detector 23 is proportional to the azimuth error angle.

The output of elevation detector 22 is coupled through preamplifier 25, variable control amplifier 26 and elevation power amplifier 27 to the elevation drive motor 28. The scanner 10 is suspended between the parallel arms of a supporting yoke structure 29 and is pivoted in elevation by drive motor 28. A tachometer 30, which is mounted in the same case as elevation drive motor 28, provides derivative feedback over lead 31 to the input of elevation amplifier 27. The output of preamplifier 25 is also connected to a bandwidth adjuster 32 which varies the bandwidth of the elevation channel in accordance with the magnitude of the elevation error signal. Details of bandwidth adjuster 32 will be described hereinafter.

The output of azimuth detector 23 is coupled through preamplifier 33, variable control amplifier 34 and azimuth power amplifier 35 to azimuth drive motor 19 which positions scanner 10 in the azimuth plane through gearing 39. A tachometer 41 is mounted within the case of azimuth drive motor 19 being connected by lead 42 to the input of azimuth amplifier 35 thereby providing derivative feedback in the azimuth channel. The output of preamplifier 33 is also coupled to a bandwidth adjuster 43 which controls the bandwidth of the azimuth channel in accordance with the magnitude of the azimuth angle error voltage.

Figure 2:
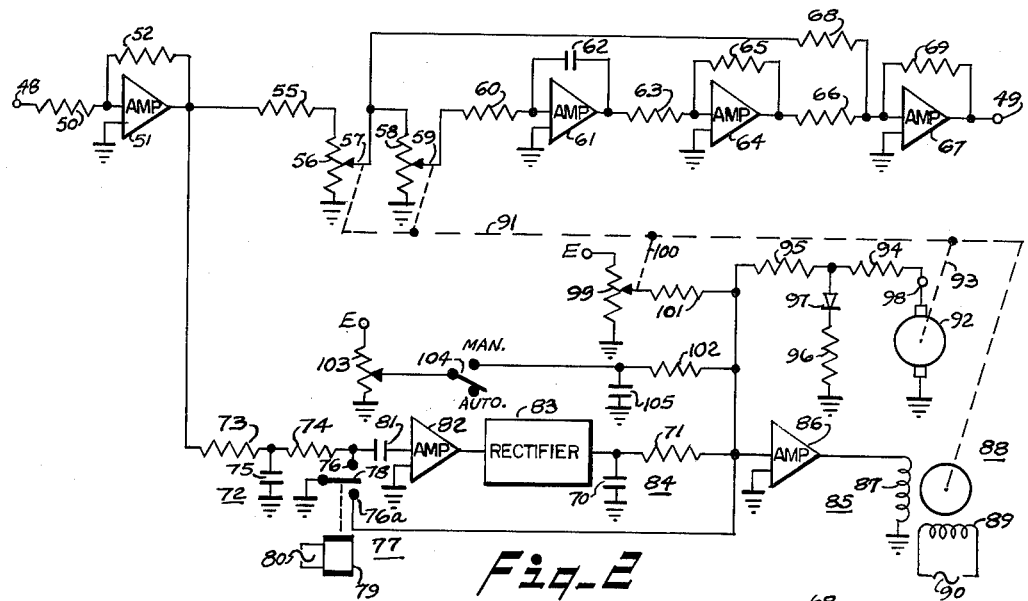
FIG. 2 is a schematic representation of a portion of the system of FIG. 1.

In FIGURE 2, details of preamplifier 25, variable control amplifier 26 and bandwidth adjuster 32 are shown. It will be understood that similar components are used in the azimuth channel and that the following explanation also applies to preamplifier 33, variable control amplifier 34 and bandwidth adjuster 43.

The output of elevation detector 22 is coupled to a terminal 48 and through an input resistor 50 to a D.-C. amplifier 51, amplifier 51 having a feedback resistor 52 coupled between its input and output terminals. The output of amplifier 51 is connected through a resistor 55 and potentiometer 56 to ground while the arm 57 of potentiometer 56 is electrically coupled to one end of a second potentiometer 58. The arm 59 of potentiometer 58 is connected through a resistor 60 to an integrating amplifier 61 having a feedback capacitor 62 connected across it. The output of amplifier 61 is coupled through an input resistor 63 to an inverting amplifier 64, having a feedback resistor 65, while the output of amplifier 64 is coupled through a resistor 66 to summing amplifier 67. The arm of potentiometer 56 is connected to summing amplifier 67 through a resistor 68, summing amplifier 67 having a feedback resistor 69 connected between its input and its output terminal 49.

Potentiometers 56 and 58 and amplifier 61, 64 and 67 together with their input and summing impedances comprise the variable control amplifier 26. Potentiometer 56 controls the magnitude of the output signal from amplifier 51 applied to potentiometer 58 and to one input of summing amplifier 67 while potentiometers 56 and 58 together control the magnitude of the output signal from amplifier 51 applied to amplifier 61. By adjusting the arms 57 and 59 of potentiometers 56 and 58 simultaneously and in the same ratio, the bandwidth of the elevation channel is varied directly as a function of the position of these arms while the damping ratio of the elevation channel is maintained constant.

When the arms 57, 59 are near the grounded ends of potentiometers 56, 58, the bandwidth of the elevation channel is a minimum. Moving the arms toward the energized end of the potentiometers increases the bandwidth in direct proportion to the displacement of arms 57, 59 from their grounded ends. If only potentiometer 56 were adjusted to vary the bandwidth of the system, the break point at the low frequency end of the transfer characteristic would occur at the same frequency for all settings of the potentiometer. The gain of the system at the break point would, however, vary as a function of the displacement of the arm of potentiometer 56 from its grounded end. By connecting the error signal to amplifier 61 through the second potentiometer 58, the low-frequency break point of the transfer characteristic is made to occur at the same value of gain for all settings of the potentiometer arms thereby maintaining the damping ratio fixed as the bandwidth is varied. In other words, the transfer characteristic is moved parallel to itself along the frequency axis by adjusting potentiometers 56 and 58 together, thereby changing the frequency at which the break point occurs but not the shape of the open-loop gain frequency curve. Limit stops (not shown) are provided on potentiometers 56 and 58 to prevent reduction in bandwidth below a predetermined value.

The output of amplifier 51 is also connected through a low-pass filter 72 comprising series resistors 73 and 74 and a capacitor 75 connected between the junction of the resistors and ground. The purpose of the low-pass filter is to smooth the error signal and attenuate the high-frequency noise components so that the bandwidth will be a function of the error signal due to the dynamics of the target course and not a function of the noise in the error signal. The output of low-pass filter 72 is connected to one contact 76 of a chopper 77 having its vibrating arm 78 grounded. The coil 79 of chopper 77 is energized by an alternating voltage source 80. The output of low-pass filter 72, which is modulated by chopper 77, is fed through a capacitor 81 and an A.-C. amplifier 82 to a rectifier 83. Rectifier 83, which may be a voltage doubler or any other suitable type of rectifying device, provides a D.-C. voltage output having a fixed polarity regardless of the polarity of the error signal. The rectifier output voltage is coupled to a smoothing circuit 84 consisting of a capacitor 70 and a resistor 71 and, after modulation by means of chopper contact 76a and arm 78, is fed to an A.-C. servo amplifier 86. Amplifier 86, comprising part of positional servo 85, is coupled to the control winding 87 of a two-phase motor 88 having a reference winding 89 excited from an alternating voltage source 90. Since the bandwidth of the servo is to be a function of the magnitude of the error voltage only and does not depend upon the direction of the error, rectifier 83 is required to provide a uni-directional output. The shaft of two-phase motor 88 is coupled by mechanical connection 91 to the arms of potentiometers 56 and 58 thereby adjusting the bandwidth of the variable control amplifier 26 in direct proportion to the magnitude of the elevation error voltage.

A tachometer 92, provided for stabilization of positional servo 85, is coupled to the shaft of two-phase motor 88 by a mechanical connection 93 and to the input of amplifier 86 through a network comprising resistors 94, 95 and 96, and rectifier 97. The purpose of this network is to permit the bandwidth of the system to be increased more rapidly than it is decreased. Thus, if a target which has been moving at a relatively constant angular velocity should suddenly accelerate, the bandwidth of the system will be increased quickly and the target will not be lost. If the radar is tracking a rapidly maneuvering target, however, and the target suddenly assumes a more nearly constant angular velocity, the bandwidth will begin to decrease at a relatively slow rate. An immediate resumption of target maneuvering, therefore, does not require as great an increase in bandwidth as would be necessary if the rate of bandwidth decrease were as high as the rate of increase.

When the error signal is increasing in magnitude, servo motor 88 turns in such a direction as to move the arms of potentiometers 56 and 58 away from their grounded terminals. Under these conditions, the polarity of the voltage at terminal 98 of tachometer 92 is positive and current flows through rectifier 97 and resistor 96 to ground. The feedback voltage coupled to the input of amplifier 86 is, therefore, smaller than it would be if rectifier 97 were not conducting and motor 88 will respond more quickly to the error signal. On the other hand, when the magnitude of the error voltage is decreasing and servo motor 88 is turning in the opposite direction thereby moving potentiometers 56 and 58 toward their grounded ends, the polarity of the output voltage of tachometer 92 will be negative. Rectifier 97 will not conduct and the full negative output voltage will be coupled to the input of amplifier 86 thus lowering the speed with which servo motor 88 will reduce the bandwidth of amplifier 26. A negative positional feedback signal is applied to servo amplifier 86 through a potentiometer 99 having one end connected to a voltage source E and the other end grounded. The arm of potentiometer 99 is coupled to motor 88 through mechanical connection 100 and to the input of amplifier 86 through resistor 101.

Before a target has been acquired by the radar, the magnitude of the error voltage will be essentially zero and the system, as thus far described, would be automatically set for minimum bandwidth. It is usually desirable, however, to provide a relatively wide bandwidth when the radar is being used for purposes other than automatic tracking, such as searching for a target. A voltage of fixed amplitude is, therefore, coupled to the input of amplifier 86 through a resistor 102 from potentiometer 103 when an AUTO.-MAN. selector switch 104 is placed in the MAN. position. This voltage, which is modulated by chopper 77, causes servo motor 88 to adjust the arms of potentiometers 56 and 58 to achieve the desired bandwidth. With switch 104 in the manual position, capacitor 105 is charged to a voltage determined by the setting of the arm of potentiometer 103 and the magnitude of the potentiometer excitation voltage E. When switch 104 is moved to the AUTO. position for automatic tracking, potentiometer 103 is disconnected and capacitor 105 discharged through resistor 102 thereby minimizing any transient voltages which might otherwise be caused by a sudden change in voltage at the input to amplifier 86.

In the embodiment of the invention shown in FIGURES 1 and 2, the bandwidth of the elevation channel is varied as a direct function of the elevation error voltage by bandwidth adjuster 32, while the bandwidth of the azimuth channel is varied directly with the azimuth error voltage by a second bandwidth adjuster 43.

Figure 3:
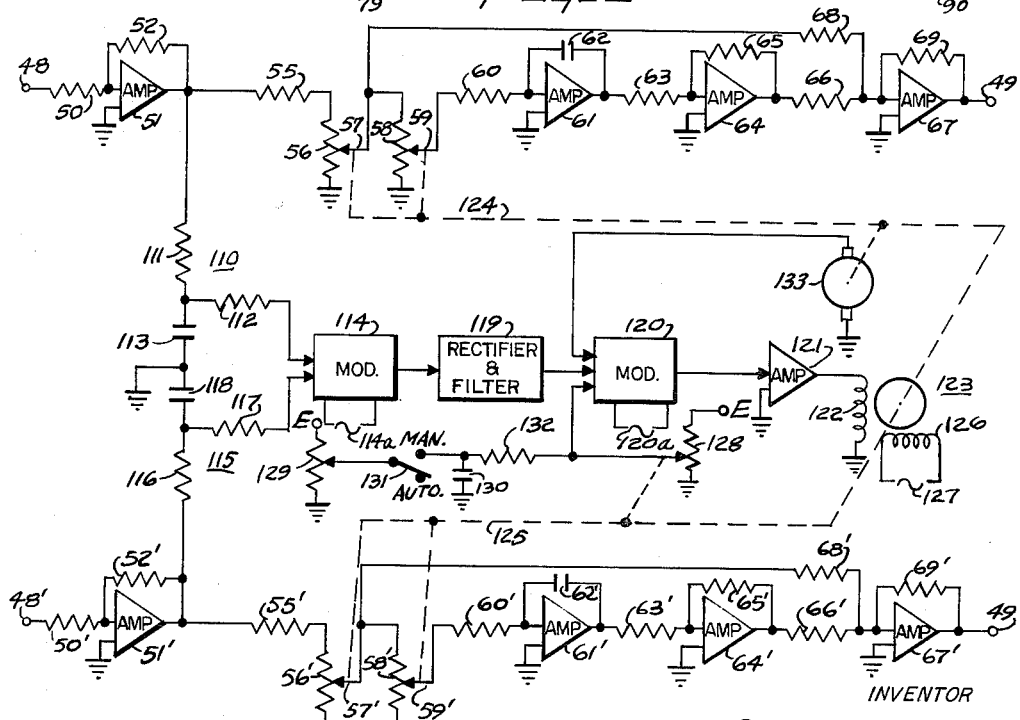
FIG. 3 is a schematic representation showing another embodiment of the invention.

A considerable saving in equipment and a reduction in system complications may be realized by using the system shown in FIG. 3 wherein the elevation and traverse error voltages are added algebraically, and their sum applied to a single positional servo which controls the bandwidth of the elevation and azimuth channels simultaneously. Referring to FIG. 3, the components in the elevation channel are each designated by the same numerals as are used in FIGS. 1 and 2, and the components in the azimuth channels, since they are similar to those in the elevation channel, are designated by identical primed numerals. Since the operation of the preamplifier and variable control amplifiers have already been described in connection with FIGS. 1 and 2, this description will not be repeated here.

In this second form of the invention, the output of amplifier 51 is coupled through a low-pass filter 110, comprising resistors 111, 112 and a capacitor 113, to the input of a modulator 114 having a reference voltage supply 114a. Similarly, the output of amplifier 51' is coupled through a low-pass filter 115 comprising resistors 116, 117 and capacitor 118 to the input of modulator 114. Modulator 114 is coupled to rectifier and filter unit 19 providing a smoothed D.C. output voltage having a magnitude proportional to the sum of the elevation and azimuth error voltages. This D.C. voltage is converted to an alternating voltage in modulator 120, having a reference voltage supply 120a, and applied to an A.C. amplifier 121 which energizes the control winding 122 of two-phase servo motor 123.

The shaft of two-phase motor 123 is coupled by mechanical connection 124 to potentiometers 56 and 58 in the elevation channel and by mechanical connection 125 to potentiometers 56' and 58' in the azimuth channel. Motor 123, having a reference winding 126 excited from an alternating voltage source 127, adjusts the bandwidths of the elevation and azimuth channels simultaneously as a funcion of the sum of the elevation and azimuth error voltages while maintaining the damping ratio of each channel fixed. Negative positional feedback is obtained from potentiometer 128, having a voltage E connected across it, while the arm of potentiometer 128 which is driven by motor 123, is coupled to the input of modulator 120. Stabilization of the bandwidth adjusting servo is obtained by applying the output of tachometer 133, which is coupled to the shaft of two-phase motor 123, to the input of modulator 120.

In order to provide a wide system bandwidth when the radar is not tracking a target, the voltage on the arm of a potentiometer 129 may be connected across a capacitor 130 by setting AUTO.-MAN. selector switch 131 to its MAN. position. This voltage is coupled through resistor 132 to the input of modulator 120 to control the setting of potentiometers 56, 56', 58, and 58' by servo motor 123. When switch 131 is set at AUTO., capacitor 130 discharges and the bandwidth of the elevation and azimuth channels is then determined solely by the magnitude of the composite error signal.

One of the significant features of the invention is that it automatically adjusts the radar system for optimum tracking as a function of target maneuvers relative to the radar antenna. Minimum bandwidth, and hence maximum noise attenuation, is maintained for targets having a low angular acceleration, the bandwidth being automatically expanded as the angular acceleration of the target increases. The maximum bandwidth is limited to a value below that which will result in unstable scanner oscillations while the minimum bandwidth is kept wide enough to maintain tracking of targets having a constant angular acceleration with little or no error. In addition, the damping ratios of the elevation and azimuth channel servos are maintained constant as the bandwidth is varied thus assuring optimum tracking over the entire bandwidth range.

As many changes could be made in the above construction and many different embodiments could be made without departing from the scope thereof, it is intended that all matter contained in the above description or shown in the accompanying drawing shall be interpreted as illustrative and not in a limiting sense.

What is claimed is:

1. A control system for positioning an output member in accordance with an applied input signal comprising error signal means responsive to the position of said output member and to said applied input signal, variable control amplifying means coupled to said error signal means and to said output member, low-pass filter means coupled to said error signal means, and bandwidth adjusting means coupled to said low-pass filter means and to said variable control amplifying means, said bandwidth adjusting means varying the response of said amplifying means in accordance with the magnitude of said error signal means.

2. In a feedback control system including an error signal source, amplifying means coupled to said error signal source, and movable output means connected to said amplifying means, the combination comprising bandwidth adjusting means coupled to said error signal source and to said amplifying means, said bandwidth adjusting means varying the response of said amplifying means in accordance with the magnitude of said error signal source, and means coupled from said bandwidth adjusting means to said amplifying means for maintaining the damping ratio of said feedback control system constant with changes in bandwidth.

3. In a feedback control system including an error signal source, amplifying means coupled to said error signal source and output means coupled to said amplifying means, the combination comprising low-pass filter means coupled to said error signal source, rectification means coupled to said low-pass filter means, and servo control means coupled to said rectification means and to said amplifying means, said servo control means varying the bandwidth of said amplifying means as a function of the magnitude of the output of said error signal source and maintaining the damping ratio of said feedback control system constant with changes in bandwidth.

4. In a feedback control system including an error signal source and movable output means, the combination comprising potentiometer means coupled to said error signal source, amplifying means coupling said potentiometer means to said movable output means, and bandwidth adjusting means coupled to said error signal source and to said potentiometer means, said bandwidth adjusting means varying the setting of said potentiometer means in accordance with the output of said error signal source.

5. A feedback control system as defined in claim 4 wherein said bandwidth adjusting means includes positional servo means responsive to the magnitude of said error signal source, said positional servo means setting said potentiometer means in accordance with the magnitude of the output of said error signal source.

6. A feedback control system as defined in claim 4 wherein said amplifying means includes a direct channel, an integrating channel, summing means, and means coupling the outputs of said direct and integrating channels to the input of said summing means, and wherein said potentiometer means includes first and second potentiometers, said first potentiometer varying the input signal to said direct channel and said second potentiometer varying the input signal to said integrating channel.

7. In a feedback control system including an error signal source and controllable output means, the combination comprising amplifying means having first and second channels and means coupling the outputs of said first and second channels to said output means; first and second potentiometers each having a fixed element and a movable element, said first potentiometer coupling said error signal source to said first channel and said second potentiometer coupling said error signal source to said second channel, and bandwidth adjusting means coupled to said error signal source, said bandwidth adjusting means including a servo motor responsive to the magnitude of said error signal source coupled to the movable elements of said first and second potentiometers.

8. In a feedback control system having a movable output member, the combination comprising amplifying means coupled to said output member and adapted to receive an applied error signal voltage, means coupled to said amplifying means for varying the bandwidth thereof in accordance with an applied input signal, and means coupled to said amplifying means for maintaining the damping ratio of said fedback control system constant with changes in bandwidth.

9. A feedback control system as defined in claim 8 wherein the magnitude of the input signal applied to said means for varying the bandwidth of said amplifying means corresponds to the magnitude of said applied error signal voltage.

10. A positional control system for controlling a movable object in accordance with an applied error signal comprising amplifying means including a direct channel, an integrating channel, and means coupling the outputs of said direct and integrating channels to said movable object; a first potentiometer having its fixed element adapted to receive said applied error signal and its movable element connected to said direct channel; a second potentiometer having its fixed element connected to the movable element of said first potentiometer and having its movable element connected to said integrating channel; and bandwidth adjusting means adapted to receive said applied error signal, said bandwidth adjusting means including motor means mechanically coupled to the movable elements of said first and second potentiometers, each of said movable elements being displaced in direct proportion to the magnitude of said applied error signal.

11. An automatic tracking system comprising an antenna mounted for movement in elevation and azimuth, receiver means connected to said antenna for supplying signal voltages proportional to the elevation and azimuth components of the angular error between the directive axis of said antenna and the direction to a distant target, elevation amplifying means connected to said receiver means to receive the elevation component of error voltage, means coupled to said elevation amplifying means and to said antenna for driving said antenna in elevation, azimuth amplifying means connected to said receiver means to receive the azimuth components of error voltage, means coupled to said azimuth amplifying means and to said antenna for driving said antenna in azimuth, first and second bandwidth adjusting means connected to said receiver means, said first bandwidth adjusting means being coupled to said elevation amplifying means for adjusting the response of said elevation amplifying means in accordance with the magnitude of the elevation component of error voltage and maintaining the damping ratio of the elevation channel constant, and said second bandwidth adjusting means being coupled to said azimuth amplifying means for adjusting the response of said azimuth amplifying means in accordance with the magnitude of the azimuth component of error voltage and maintaining the damping ratio of the azimuth channel constant.

12. An automatic tracking system as defined in claim 11 wherein said system includes means for manually adjusting the response of said elevation and azimuth amplifying means when said system is not tracking a target.

13. An automatic tracking system comprising an antenna mounted for movement in elevation and azimuth, receiver means connected to said antenna for supplying signal voltages proportional to the elevation and azimuth components of the angular error between the directive axis of said antenna and the direction to a distant target, elevation amplifying means connected to said receiver means to receive the elevation component of error voltage, means coupled to said elevation amplifying means and to said antenna for driving said antenna in elevation, azimuth amplifying means connected to said receiver means to receive the azimuth component of error voltage, means coupled to said azimuth amplifying means and to said antenna for driving said antenna in azimuth, and bandwidth adjusting means connected to said receiver to receive the sum of the elevation and azimuth components of error voltage, said bandwidth adjusting means being coupled to said elevation and azimuth amplifying means for varying the bandwidth thereof in accordance with the sum of said elevation and azimuth components of the error voltage.

14. In a radio tracking system including an antenna and a receiver connected to said antenna, said receiver producing an output voltage including a signal component and a noise component, the combination comprising amplifier means coupled to said receiver, means coupled to said amplifier means and to said antenna for positioning said antenna, filter means coupled to said receiver for separating said signal component from said noise component, and control means responsive to said signal component coupled to said filter means and to said amplifying means, said control means adjusting the bandwidth of said amplifying means in accordance with said signal component.

15. In a radio tracking system including an antenna and a receiver connected to said antenna, said receiver producing an output voltage comprised of a band of frequency components, the combination comprising amplifier means coupled to said receiver, means coupled to said amplifier means and to said antenna for positioning said antenna, filter means coupled to said receiver, rectifier means coupled to the output of said filter means, and control means coupled to the output of said rectifier means and to said amplifying means for adjusting the bandwidth of said amplifying means and maintaining the damping ratio of said radio tracking system constant.

16. In a radio tracking system including an antenna and a receiver connected to said antenna, said receiver producing an output voltage comprised of a band of frequency components, the combination comprising amplifier means coupled to said receiver, said amplifier means including potentiometer means for varying the bandwidth of said amplifier means, means coupled to said amplifier means and to said antenna for positioning said antenna, filter means coupled to said receiver, rectifier means coupled to the output of said filter means, and positional servo means having a servo amplifier coupled to the output of said rectifier means and a servo motor connected to said servo amplifier, said servo motor having its output shaft coupled to said potentiometer means thereby varying the bandwidth of said amplifier means in direct proportion to the output of said rectifier means.

17. A radio tracking system as defined in claim 16 wherein said positional servo means includes non-linear circuit means for driving said servo motor at a higher speed when the output of said rectifier means is increasing in magnitude than when it is decreasing in magnitude.

References Cited by the Examiner

UNITED STATES PATENTS

| | | | |
|---|---|---|---|
| 2,647,258 | 7/53 | McCoy | 318—448 |
| 2,698,932 | 1/55 | Wathen | 343—7.4 |
| 2,704,490 | 3/55 | Hammond | 343—117 |
| 2,760,131 | 8/56 | Braunagel | 318—28 |
| 2,784,402 | 3/57 | White et al. | 343—7.4 |
| 2,880,384 | 3/59 | Surtees | 244—77 |

CHESTER L. JUSTUS, *Primary Examiner.*